May 12, 1931.  T. H. TROY  1,804,963
ANIMAL SHEARS
Filed Aug. 8, 1929
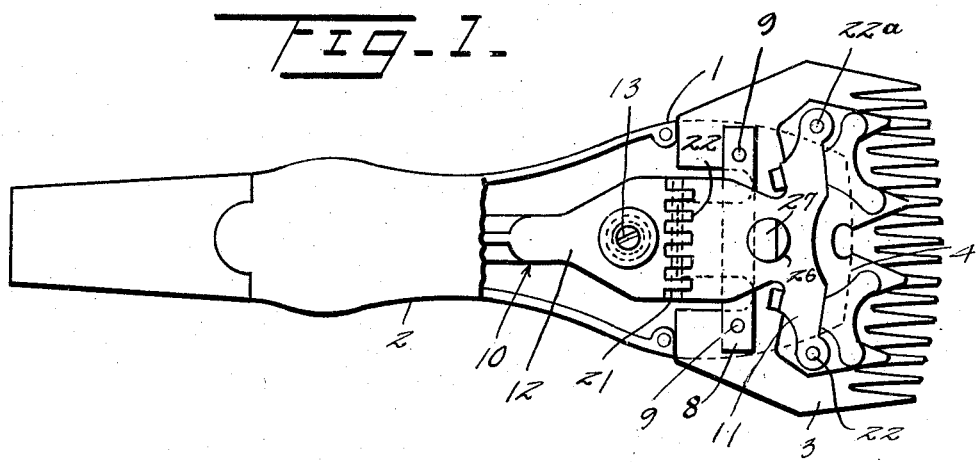
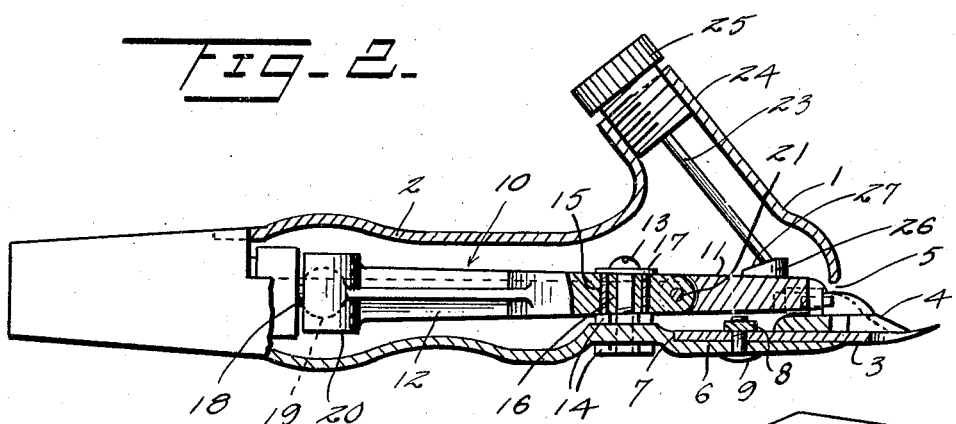
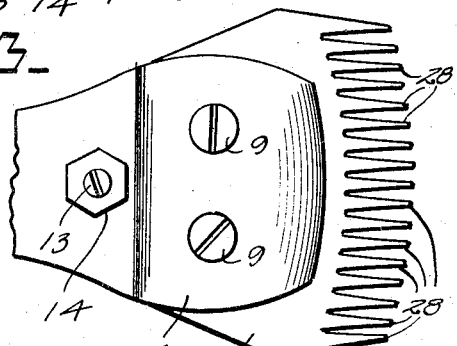
Inventor
T. H. Troy
By Watson E. Coleman
Attorney Patented May 12, 1931

1,804,963

UNITED STATES PATENT OFFICE

THOMAS H. TROY, OF BOISE, IDAHO

ANIMAL SHEARS

Application filed August 8, 1929. Serial No. 384,248.

This invention relates to animal shears, and has for one of its objects to provide a device of this character which shall be especially adapted for shearing sheep and wherein the comb or stationary cutter blade shall be supported in a manner to prevent it from springing downwardly when under heavy tension.

The invention has for a further object to provide shears of the character stated wherein the comb shall be equipped with a comparatively large number of short and closely related teeth to the end that the shears will cut smoother and faster than those now in use.

The invention has for a further object to provide shears of the character stated wherein the movable cutter blade operating means shall embody a swivel fork pivotally mounted upon a stationary post, the post being adapted to maintain the fork in proper place at all times and thus obviate the necessity for adjusting the fork in order to maintain the shears in a highly efficient condition.

The invention has for a further object to provide shears of the character stated wherein the swivel fork shall embody front and rear sections, wherein the rear fork section shall be pivoted to the stationary post, and wherein the front section shall be connected to the movable cutter blade and connected to the rear section by a pivot arranged at right angles to the stationary post so as to permit thick or thin movable cutter blades to be used.

The invention has for a further object to provide shears of the character stated wherein the pivotal connection between the front and rear swivel fork sections shall be arranged close to the front side of the stationary post to the end that a substantial driving connection may be established between the sections. The invention has for a still further object to provide shears of the character stated wherein the front section of the swivel fork shall be provided near its front end with a seat for a tension element, the location of the seat permitting the movable cutter blade to be held against the comb under the required tension.

With the foregoing and other objects in view, the nature of which will appear as the description proceeds, the invention consists in the construction, combination and arrangement of parts hereinafter fully described and claimed, and illustrated in the accompanying drawings, wherein:—

Figure 1 is a top plan view of the shears with the upper section of the head and a portion of the rear section of the handle omitted;

Figure 2 is a view partly in side elevation and partly in longitudinal section of the shears; and Figure 3 is a bottom plan view of the comb and a portion of the head of the shears.

Referring in detail to the drawings, 1 designates the head, 2 the handle, 3 the comb or stationary cutter blade, and 4 the movable cutter blade of the shears. The head 1 and the handle 2 are hollow, and they embody upper and lower sections which may be connected together in any suitable manner. The head 1 is provided in its front and lateral sides with the opening 5 through which the comb 3 and the cutter blade 4 extend.

The lower side of the head 6 has a flat upper surface and an upwardly and forwardly inclined lower surface, this part constituting a rest or support for the comb 3. The support 6 is of considerable length, and it extends from the rear edge of the comb 3 to a point in close proximity to the rear ends of the teeth of the comb, so as to prevent the comb from springing downwardly when under heavy tension. The head 1 is provided with an inner shoulder 7 which is arranged at the inner end of the support 6 and extends transversely thereof. The comb 3 is mounted upon the support 6 with its rear edge in contact with the shoulder 7, and it is secured to the support by a bar 8, which rests upon its upper side and by machine screws 9 which pass through the support and comb and engage the bar, the bar serving to hold the comb flat against the support.

The means for operating the movable cutter blade 4 comprises a swivel fork 10, which consists of a short front section 11 and a long rear section 12. The fork section 12 is hinged near its front end upon a stationary post 13, which is rigidly secured to and extends upwardly from the lower side of the head 1. The post 13 is located near the comb support 6, it passes through the lower side of the head 1, and it is secured in place by nuts 14, which are engaged therewith and contact with the upper and lower surfaces of said side of the head. The opening 15 provided in the fork section 12 for the reception of the post 13, is provided with a bushing 16, which surrounds the post between the upper nut 14 and a washer 17 arranged upon the post and contacting with the head thereof. The stationary post 13 holds the swivel fork 10 in proper place at all times, and due thereto, adjustment of the fork is not necessary in order to maintain the shears in a highly efficient condition.

The stationary post 13 mounts the swivel fork 10 for lateral swinging movement and this movement may be imparted thereto by any suitable means. The means shown comprises a shaft 18, which is adapted to be connected to an electric or other motor by a flexible shaft, not shown. This means also comprises a cam 19, which is carried by the shaft 18 and arranged within a yoke 20 on the swivel fork 10.

The front swivel fork section 11 is connected at its rear end to the front end of the fork section 12 for movement about an axis 21 arranged at right angles to the stationary post 13. The adjacent ends of the fork sections 11 and 12 are laterally enlarged and provided with interfitting lugs 22 through which the pivot pin 21 passes. The pivotal connection between the fork sections 11 and 12 permits the fork section 11 to be raised and lowered in order to permit a movable cutter blade of the required thickness to be used. The pivotal connection between the fork sections 11 and 12 is located close to the stationary post 13 in order to establish a substantially rigid driving connection between these parts.

The swivel fork section 11 is connected to the movable cutter blade 4, as at 22ª. The cutter blade 4 is held in contact with the comb 3 by a tension rod 23, which contacts with the swivel fork section 11. The head 1 is provided with an upwardly and rearwardly inclined tubular extension 24 in which is screw threadedly engaged an adjusting element 25 for the tension rod 23. The swivel fork section 11 is provided with a seat 26 for the tension rod 23, and the seat is located near the front end of said fork section so as to insure the holding of the movable cutter blade 4 in full abutting contact with the comb 3.

The upper end of the tension rod 23 is secured to the adjusting member 25 and the lower end thereof rests upon the downwardly and rearwardly inclined upper surface 27 of the seat 26.

The comb 3 has a greater number of teeth than the corresponding part of the animal shears now on the market. These teeth 28 are comparatively short and closely related. Due to their number and their close relation, and to the fact that they are short, the shears cuts wool smoother and faster than the shears now in use.

From the foregoing description, taken in connection with the accompanying drawing, it will be apparent that the comb 3 is firmly secured to its support 6, is held by the support against downward springing when under heavy tension, and insures the smooth and rapid cutting of wool. It will also be apparent that the mounting of the swivel fork 10 upon the stationary post 13 insures the fork remaining in proper position without adjustment, that the close association of the post 13 and the pivot 21 of the sections 11 and 12 of the swivel fork 10 and the location of the post and pivot close to the front end of the swivel fork, establishes a substantially rigid driving connection between the swivel fork sections and eliminates heating of the machine and vibration. It will still further be apparent that the location of the tension rest 26 near the front end of the swivel post section 11 insures the maintenance of the movable cutter blade 4 in full abutting contact with the comb.

While I have described the principle of the invention together with the structure which I now consider the preferred embodiment thereof, it is to be understood that the structure shown is merely illustrative and that such changes may be made, when desired, as fall within the scope of the invention as claimed.

I claim:—

1. A shears of the character set forth, comprising a comb having a large number of short and closely related teeth, a support for the comb extending from the rear end thereof to a point close to the rear ends of the teeth, a bar extending across the comb and contacting throughout its entire length with the upper surface of the comb, screws passing through the support and comb and engaging the bar, a shoulder at the rear end of the support contacting with the rear end of the comb, a movable cutter blade mounted upon the comb, a stationary post adjacent the rear ends of the comb and support, a swivel bar embodying a short front and a long rear section, means pivotally connecting the sections together, said means comprising a plurality of spaced interfitting lugs, and a pivot extending through said lugs, the long fork section being connected to the post adjacent said pivotal connection and the short front section being located above the bar, means securing the front end of the long fork section to the movable cutter blade, a seat secured to the short post section adjacent the front end of the latter and provided with a downwardly and rearwardly inclined upper surface, and a tension bar contacting with said surface of the seat.

2. A shears of the character set forth, comprising a head, a comb, a movable cutter blade mounted upon the comb, a stationary post having its lower end extending through the head and provided at its upper end with a head, upper and lower members engaging the post and contacting with the upper and lower surfaces of said first head to fixedly secure the post thereto, a swivel fork embodying pivotally connected front and rear sections of which the latter is provided near said connection with an opening receiving the post, said front and rear sections having a plurality of spaced interfitting lugs and a pivot for securing said lugs together, a bushing arranged in said opening and surrounding the post and resting upon said upper member, a member arranged between the upper end of the bushing and the head of the post, and a tensioning element contacting with the front fork section.

In testimony whereof I hereunto affix my signature.

THOMAS H. TROY.